C. H. VAN NOSTRAND.
ROTARY PLOW.
APPLICATION FILED MAY 18, 1909
955,297.
Patented Apr. 19, 1910.
3 SHEETS—SHEET 3.
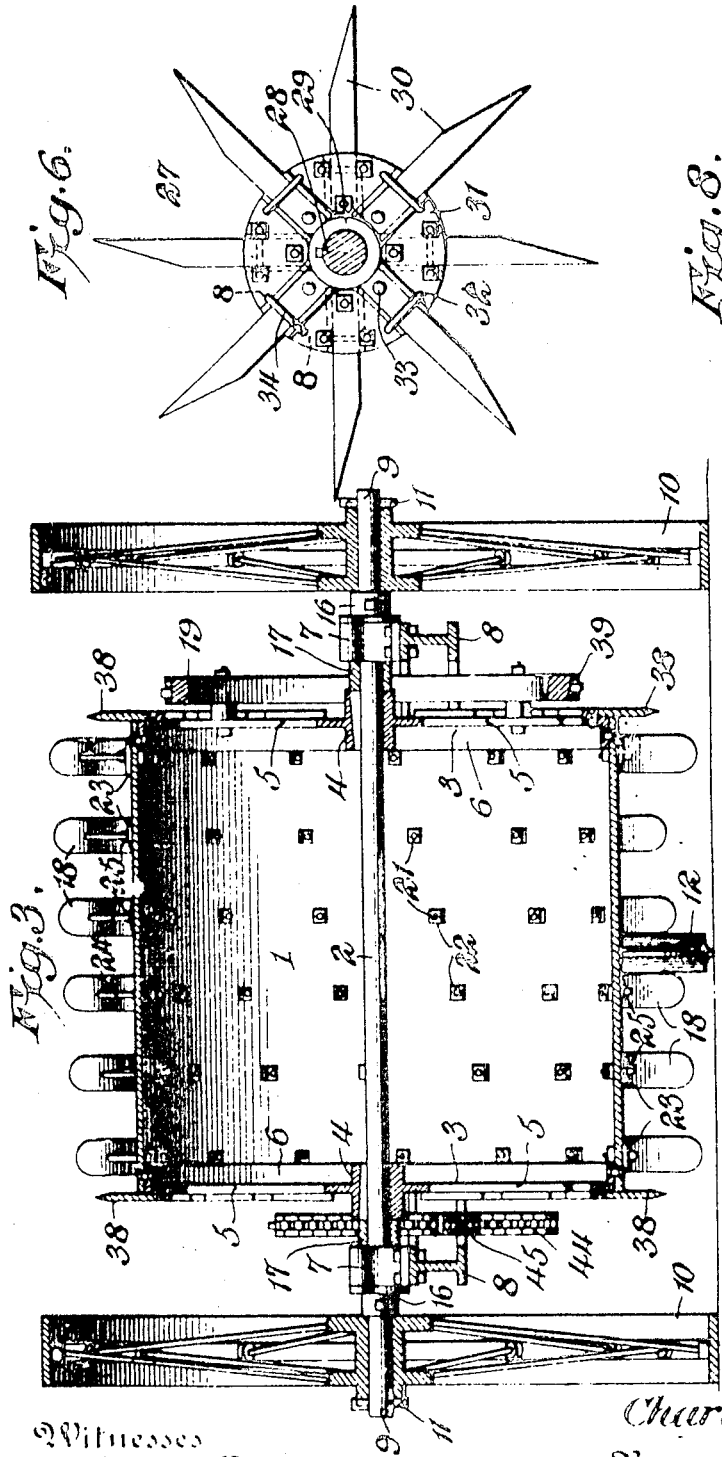
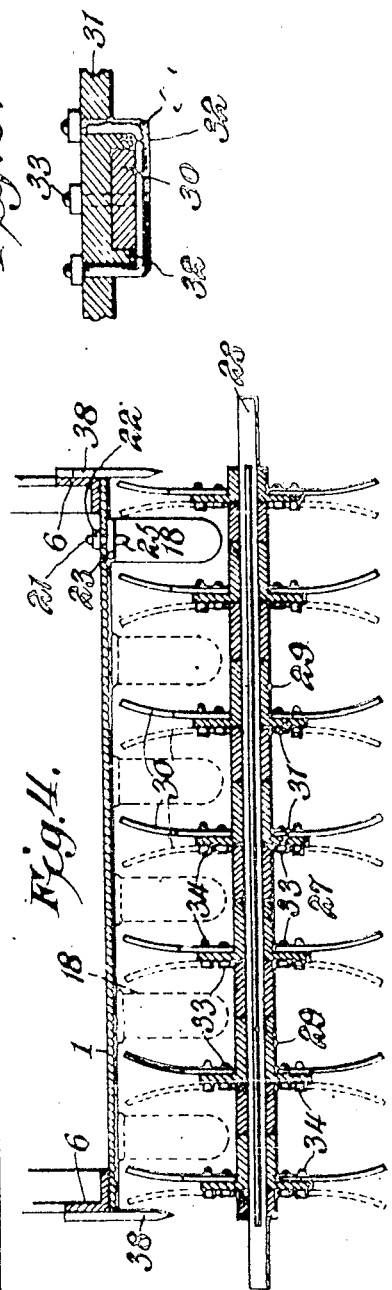
Witnesses
Howard J. Orr
M. J. Riley
Inventor,
Charles H. Van Nostrand,
By
E. G. Siggers
Attorneys

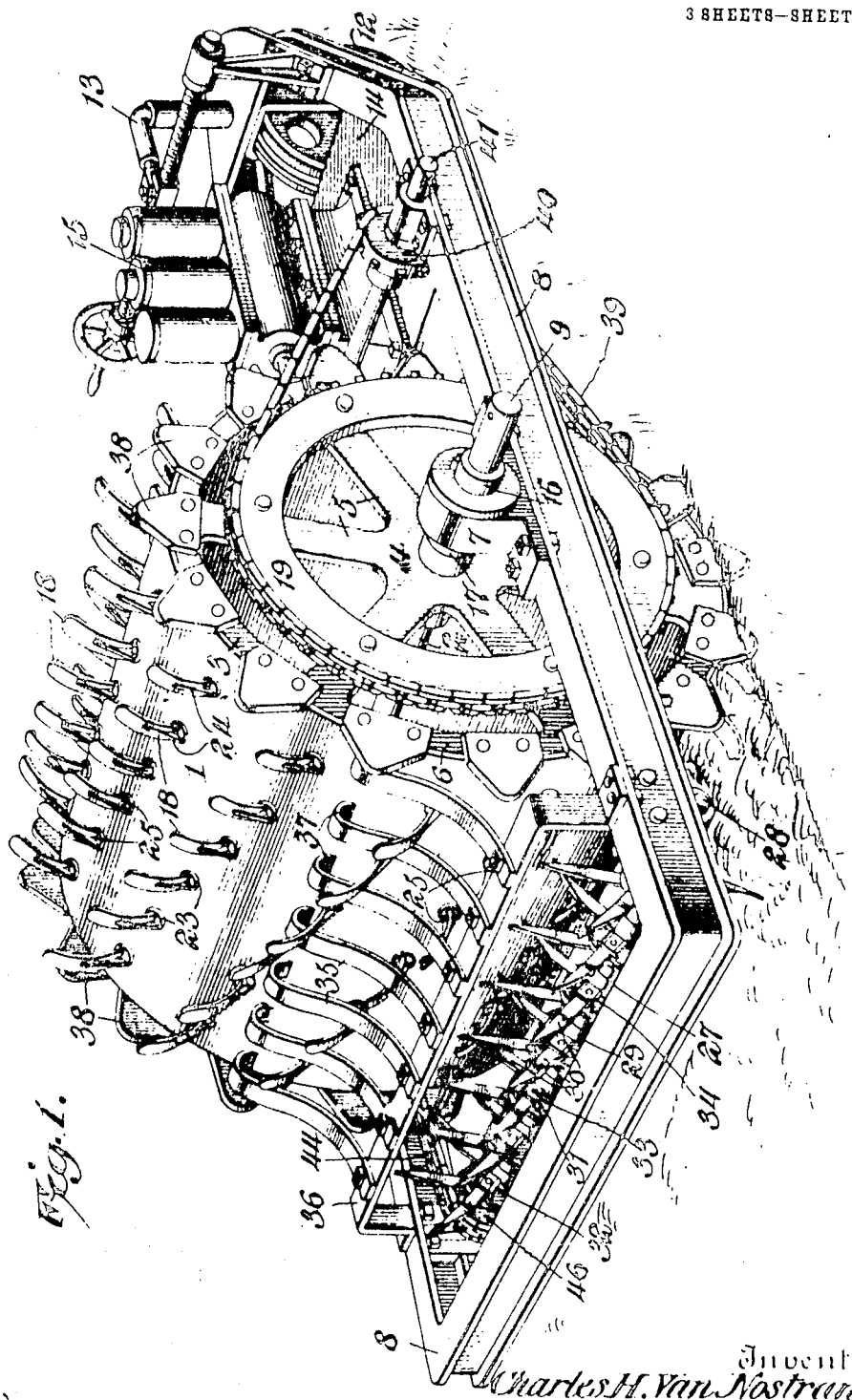

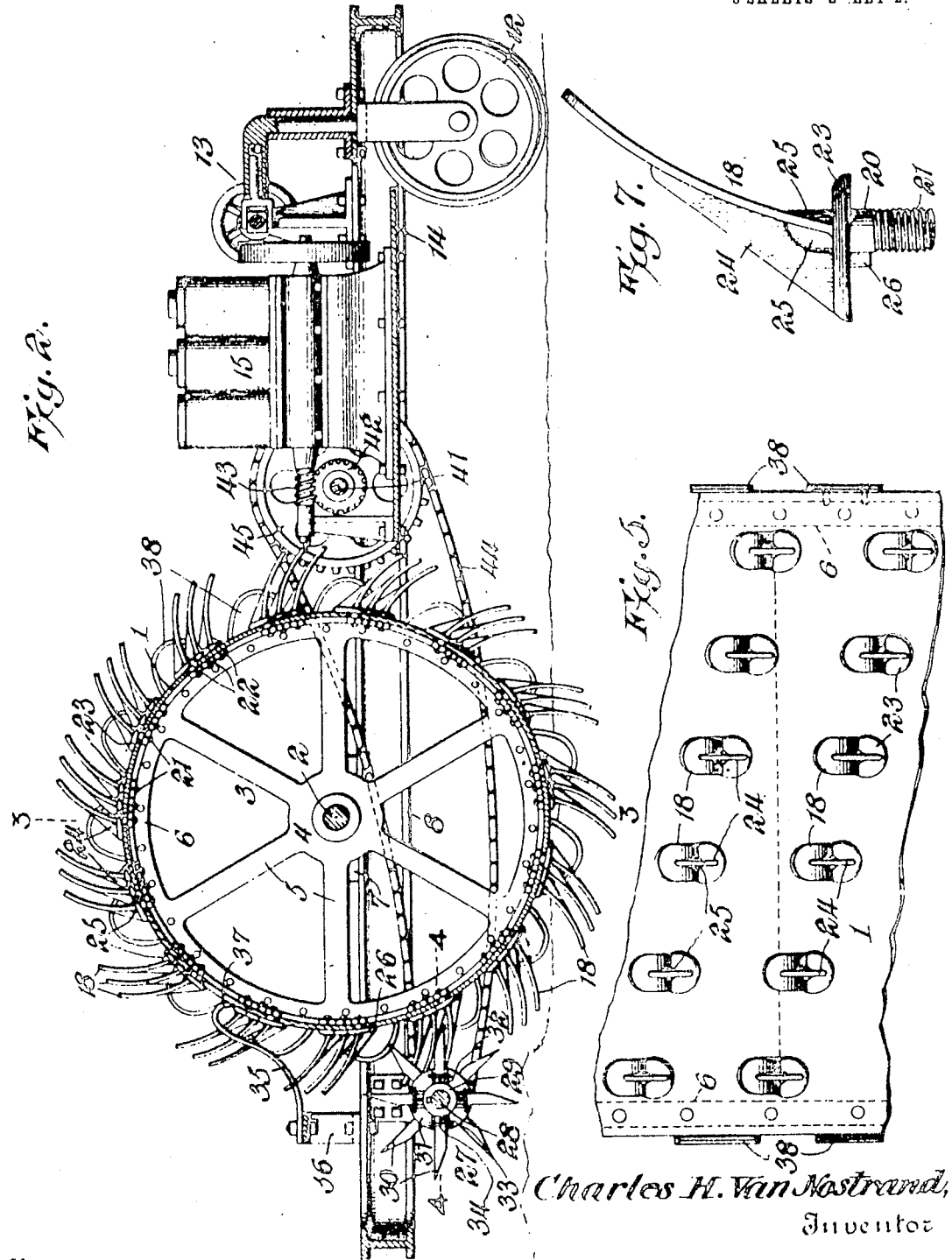

UNITED STATES PATENT OFFICE.

CHARLES H. VAN NOSTRAND, OF OMAHA, NEBRASKA.

ROTARY PLOW.

955,297.

Specification of Letters Patent.

Patented Apr. 19, 1910.

Application filed May 18, 1909. Serial No. 496,861.

*To all whom it may concern:*

Be it known that I, CHARLES H. VAN NOSTRAND, a citizen of the United States, residing at Omaha, in the county of Douglas and State of Nebraska, have invented certain new and useful Improvements in Rotary Plows, of which the following is a specification.

The invention relates to a rotary plow.

The object of the present invention is to improve the construction of rotary plows, and to provide a simple and comparatively inexpensive one, adapted to be operated at the expenditure of a minimum amount of power, and capable of preparing the soil with great rapidity for the planting of seed.

Another object of the invention is to provide a self cleaning rotary plow of this character, adapted with a relatively slight expenditure of force to elevate the soil a short distance above the ground, and to pulverize the soil and cause the same to fall at the back of the machine in a finely divided condition, so that a planter may be used in connection with the machine for sowing the seed as the rotary plow travels over the land.

With these and other objects in view, the invention consists in the construction and novel combination of parts hereinafter fully described, illustrated in the accompanying drawings, and pointed out in the claims hereto appended; it being understood that various changes in the form, proportion, size and minor details of construction, within the scope of the claims, may be resorted to without departing from the spirit or sacrificing any of the advantages of the invention.

In the drawings:—Figure 1 is a perspective view of a rotary plow, constructed in accordance with this invention. Fig. 2 is a longitudinal sectional view of the same. Fig. 3 is a transverse sectional view on the line 3—3 of Fig. 2. Fig. 4 is a similar view, taken substantially on the line 4—4 of Fig. 2. Fig. 5 is a plan view of a portion of the traction drum or cylinder, illustrating the arrangement of the teeth. Fig. 6 is an elevation of one of the sections of the rotary pulverizing and cleaning device, the shaft being in section. Fig. 7 is a detail view of one of the teeth of the plow. Fig. 8 is a sectional view on the line 8—8 of Fig. 6.

Like numerals of reference designate corresponding parts in all the figures of the drawings.

The rotary plow comprises in its construction a hollow traction drum or cylinder 1, designed to be constructed of boiler iron, or other suitable material, and connected with a transverse shaft or axle 2 by means of circular end frames or spiders 3, consisting of central hub portions 4 to receive the shaft or axle, radial arms or spokes 5 and an annular rim 6, fitting within the cylindrical shell or drum 1 and secured to the same by suitable fastening devices. The axle is journaled in suitable bearings 7 of a supporting frame 8, located below the horizontal plane of the axle to arrange the center of gravity of the machine at a low point, and thereby preventing the machine from becoming top heavy, and eliminating any tendency of the same to overturn. The bearings 7 may be of any preferred construction, and the axle is extended beyond the sides of the frame to provide laterally projecting spindles 9, adapted to receive carrying wheels 10, which are designed to be placed on the ends of the axle, when it is desired to transfer the machine from one place to another. The carrying wheels 10 are detachably secured upon the spindle portions of the axle by means of keys 11, or other suitable fastening means, and the front of the frame is preferably supported by a caster wheel 12, which is connected with suitable steering mechanism 13, by means of which the rotary plow or cultivating machine is guided over the land. As the steering mechanism does not constitute a portion of the present invention, a detail description thereof is deemed unnecessary.

The supporting frame, which may be of any preferred construction, preferably consists of channeled iron beams, being composed of two sides, connected at the back by a transverse end portion and having their front portions converged and connected together at the front of the frame. The frame is provided at its front portion in advance of the traction cylinder or drum with a suitable platform 14, upon which is mounted a gas engine 15, or other suitable motor for operating the machine. In practice a suitable seat for the accommodation of the operator will be provided at the platform 14. Set collars 16 are mounted on the shaft 2 and interposed between the carrying wheels and the bearings at the outer sides thereof, as clearly illustrated in Fig. 3 of the drawings. The end frames or spiders of the drum or cylinder are keyed or otherwise secured to the axle, and spacing sleeves 17 are interposed between the end frames or spiders and the bearings at the inner sides thereof.

During the operation of the machine, the weight thereof is principally supported by the traction cylinder or drum, the carrying wheels being removed in order that the cylinder or drum may rest upon the ground, as clearly illustrated in Figs. 1 and 2 of the drawings. The traction cylinder or drum is equipped at its face with diagonal rows of teeth 18, curved slightly in the direction of the rotation of the drum or cylinder and arranged at an acute angle to the face of the drum or cylinder. In practice the curvature of the tooth preferably consists of an arc of a circle, the radius of which is one half that of the drum or cylinder. This causes each tooth to be inserted in the ground throughout its entire length at the same point or place where the terminal of the tooth first enters the ground, so that the teeth will enter the ground in a manner which will offer a minimum resistance to the forward rolling movement of the traction drum or cylinder. There is no tendency of the teeth to tear up the ground until they arrive at the vertical center of the drum or cylinder and are in position for elevating a strip of soil. The teeth at the lower portion of the front of the drum or cylinder, see Fig. 2 of the drawings, curve downwardly and the forward rolling of the drum or cylinder will carry each tooth to the ground, and cause an easy movement of the same into the soil, the blade being gradually inserted in the ground until the vertical center of the drum lies directly above the root or shank of the tooth. The continued forward rolling or rotary movement of the drum or cylinder over the ground operates as a lever, the tooth constituting the short arm thereof and the long arm extending from the bottom of the cylinder to the top of a large sprocket wheel 19, whereby the soil is easily separated from the ground. The curvature of the blades produces a relatively slow penetration of the ground and a relatively rapid elevating of the soil at the back of the traction drum or cylinder. The blades besides operating cultivating devices also serve as traction devices and secure a positive and uniform movement of the traction cylinder or drum, when the power is applied. Each tooth, which is preferably rounded at the outer end, consists of an oblong blade or body portion, provided at the inner end with a shank 20, piercing the cylindrical shell or drum and having its terminal portion 21 threaded for the reception of a nut 22, engaging the inner face of the drum or cylinder. The tooth is provided at the juncture of the shank and the blade with a plate 23, which fits against the outer face of the cylinder or drum. The tooth is also reinforced at the back of the curved blade or soil-engaging portion with a longitudinal web 24, tapered outwardly and connected with the plate 23 and the back of the tooth. The tooth is provided at the outer face of the plate 23 with enlargements 25, located in alinement with and forming a continuation of the shank and reinforcing the tooth at the juncture of the blade, the web and the plate 23. In order to prevent rotary movement of the shank 20 in the opening of the shell or drum, the former is provided adjacent to the inner face of the plate 23 with a rectangular lug 26, fitting in a corresponding recess of the drum or cylinder and constituting a key. The diagonal rows of teeth are arranged at regular intervals, and the distance between each tooth of a row is uniform. The last tooth of one row is located directly opposite the first tooth of the next succeeding row. The teeth of each row relatively engage the ground and when a strip of soil is separated from the ground the separation starts at one end of the strip and advances rapidly to the other end of the strip during the forward rotary movement of the cylinder, so that the machine is not subjected to the strain and resistance incident to a simultaneous separation of the strip of soil throughout the entire length thereof, and expenditure of power is correspondingly minimized. Each blade is set in the traction drum or cylinder with its front face square to the front, and the front faces of the teeth of each diagonal row are arranged in different transverse planes, being disposed in angular relation to the length of the row. This enables each row of teeth to elevate the strip of soil separated from the ground. The rows of teeth diverge slightly from each other, and the lifting of the soil by one diagonal row causes a packing of the soil against the faces of the lifting teeth and a corresponding separation of the soil from the back of the preceding row of teeth, which facilitates the complete removal of the soil from the traction drum or cylinder by a combined pulverizing and cleaning device 27.

The combined pulverizing and cleaning device 27 is composed of a series of sections, keyed or otherwise secured to a rear transverse shaft 28, which is journaled in suitable bearings of the frame of the machine. Each section of the pulverizing and cleaning device consists of a hub member 29 and a series of staggered blades or members 30, alternately secured to opposite sides of a central circular web 31 of the hub member. The hub member is provided at opposite sides with parallel ribs 32, and the inner ends of the pulverizing and cleaning blades or members 30 are secured between the ribs by an inner straight bolt 33 and an outer U-shaped bolt 34. The outer engaging portions of the blades 30 are tapered, two blades being preferably made from a single piece of material by cutting the same diagonally. The pulverizing and cleaning blades 30, which are preferably resilient, curve outward in opposite directions, as clearly illustrated in Fig. 4 of the drawings, and their terminals just clear the face of the traction drum or cylinder and are arranged to operate adjacent to the side edges of the teeth of the traction cylinder or drum, both in the annular spaces between the teeth and at the outer edges of the terminal teeth of the diagonal rows. The pulverizing and cleaning device is located above the ground in order to operate at a high rate of speed, and it intersects the path of movement of the teeth of the traction wheel or drum, and operates to gradually clean the teeth throughout their entire length, the teeth 18 being slowly advanced toward and moved through the rapidly rotated pulverizingn and cleaningn device. The blades of the latter cut into the elevated soil and pulverize the same, breaking up the elevated strip at each side of the teeth 16 and causing the same to fall from the teeth. The pulverizing and cleaning device is rotated at a high rate of speed in order to operate more effectively on the elevated soil, and also to render it self cleaning by throwing off any clods, stones, or other accumulation through centrifugal force. Should any of the soil lodge back of the teeth 18 and be carried upward beyond the pulverizing and cleaning device, the upward inclination of the teeth will cause the soil to drop from them, and the final cleaning of the traction drum or cylinder is effected through the medium of a transverse row of scrapers 35, consisting of strips of resilient metal, or other suitable material, secured at their lower ends to a transverse supporting bar 36 and curved upwardly and forwardly, and provided at their upper ends with terminal hook-shaped portions 37, which extend downward to and engage the face of the traction drum or cylinder between the teeth, as clearly illustrated in Fig. 1 of the drawings. The engaging ends of the scrapers are beveled, and are adapted to remove the soil adhering to the face of the drum. The transverse bar 36 has its terminal portions bent downward and extends outward and secured to the main frame of the machine at opposite sides thereof. This arches the bar 36 over the rotary pulverizing and cleaning device, which in practice is located as close to the ground and to the traction cylinder or drum as practicable, in order to render as short as possible the distance the severed soil is elevated by the teeth of the cylinder or drum.

The traction cylinder or drum is provided at opposite sides with annular series of sod-cutting blades 38, having inner attaching portions and tapered outwardly. The sod-cutting blades 38, which are riveted or otherwise secured to the rims of the end frames or spiders, are located at the ends of the spaces between the diagonal rows of the teeth 18, and they operate to cut the sod and sever the soil at the end of the strip carried upward by the teeth of the cylinder or drum. If desired, one row of sod-cutting blades may be omitted as the blades at one side of the machine will successively sever the sod at the ends of the strips, if the machine is operated continuously to the left or to the right, as is customary with agricultural machines. However, by equipping the machine with blades at each end of the drum or cylinder, the machine may be operated to the right or to the left or in any other manner. The sod-cutting blades 38 at one end of the drum or cylinder are located directly opposite those at the other end, and they enable the strips of soil elevated by the rows of teeth to be more easily and completely separated from the ground.

The sprocket wheel 19, which is secured to one of the end frames or spiders of the drum or cylinder, is connected by a sprocket chain 39 with a sprocket pinion 40 of a front transverse shaft 41, having a worm wheel 42, which is actuated by a worm 43 of the power shaft of the engine or motor 15. When the engine is started, a slow rotary movement is imparted to the traction drum or cylinder through the sprocket gearing, and a positive advance of the machine will be effected through the engagement of the teeth 18 with the ground, which, owing to their easy penetration, offer a minimum resistance in the forward movement of the machine. The pulverizing and cleaning device is driven at a relatively high rate of speed through sprocket gearing, located at the side of the machine opposite that at which the sprocket wheel 19 is arranged, and consisting of a longitudinally disposed sprocket chain 44, a front sprocket wheel 45 and a rear sprocket pinion 46. The front sprocket wheel is mounted on the front transverse shaft 41, and the rear sprocket pinion 46 is keyed or otherwise secured to the shaft 28 of the pulverizer and cleaner. The front transverse shaft 41 is journaled in suitable bearings at opposite sides of the main frame, and it may be driven by any other form of gearing, if desired.

After the operation of plowing is completed and it is desired to transfer the machine from one place or field to another, it is jacked up and the carrying wheels applied to the spindle and the axle. The carrying wheels are fixed to the axle by means of keys 11, which pierce the outer ends of the hubs of the carrying wheels, and as the lat-

Having thus fully described my invention, what I claim as new and desire to secure by Letters Patent, is:—

1. A rotary plow including a main frame, a traction drum or cylinder supporting the frame and provided with combined traction and cultivating teeth projecting from the face of the drum or cylinder and arranged to pierce the ground, means carried by the frame and connected with the drum or cylinder for rotating the same to propel the plow, said drum or cylinder being provided with extended journals projecting beyond the frame, and carrying wheels of greater diameter than the drum or cylinder and the teeth thereof adapted to be fixed to the said journals for supporting the drum or cylinder and the teeth thereof clear of the ground.

2. A rotary plow including a frame, a traction drum or cylinder supporting the frame and arranged to roll on the ground and provided with diagonal rows of fixed combined cultivating and traction teeth extending in the direction of the rotation of the drum or cylinder, each tooth having a curvature to cause it to penetrate the ground throughout its entire length at the same point through the forward rolling of the drum or cylinder.

3. A rotary plow including a frame, a traction drum or cylinder supporting the frame and arranged to roll on the ground and provided with diagonal rows of fixed combined cultivating and traction teeth extending in the direction of the rotation of the drum or cylinder, each tooth having a curvature to cause it to penetrate the ground throughout its entire length at the same point through the forward rolling of the drum or cylinder, and the said teeth having their front faces arranged straight to the front and at different transverse planes in angular relation to the diagonal plane of the rows of the teeth.

4. A rotary plow including a frame, a rotary drum or cylinder supporting the frame and arranged to roll on the ground, teeth mounted on the face of the drum or cylinder and arranged in transverse rows, and an annular series of spaced sod-cutting blades mounted on the drum or cylinder and projecting radially therefrom opposite the spaces between the rows of teeth.

5. A rotary plow including a frame, a rotary traction drum or cylinder supporting the frame and arranged to roll on the ground, combined cultivating and traction teeth projecting from the face of the drum or cylinder and arranged in transverse rows, and spaced radially arranged sod-cutting blades mounted on the drum or cylinder at the ends thereof and located opposite the spaces between the rows of blades.

6. A rotary plow including a frame, a traction drum or cylinder supporting the frame and arranged to roll on the ground, diagonal rows of combined traction and cultivating teeth projecting from the faces of the drum or cylinder, an annular series of sod-cutting blades secured to and spaced at the ends of the drum or cylinder at diametrically opposite points and located opposite the spaces between the rows of teeth.

7. A rotary plow including a frame, a traction drum or cylinder supporting the frame and arranged to roll on the ground and provided with combined traction and cultivating teeth, each consisting of a relatively long narrow oblong blade curved longitudinally, a shank formed integral with the blade and piercing the drum or cylinder, and a plate located at the juncture of the shank and the blade and formed integral with the same and fitting against the exterior of the drum or cylinder, and means for securing the shank to the said drum or cylinder.

8. A rotary plow including a frame, a traction drum or cylinder supporting the frame and arranged to roll on the ground and provided with teeth, each consisting of a relatively long narrow oblong blade rounded at the outer end and curved in the direction of the rotation of the drum or cylinder, the curvature of each tooth being such that the inner tooth is forced into the ground at the same point through the forward rolling movement of the drum or cylinder, a shank piercing the drum or cylinder and secured to the same, an integral plate arranged at the juncture of the shank and the blade and fitting against the outer face of the drum or cylinder, and a tapered web extending along the back of the blade and connected with the plate.

9. A rotary plow including a frame, a traction drum or cylinder supporting the frame and arranged to roll on the ground, combined traction and cultivating teeth projecting from the face of the drum or cylinder and arranged to enter the ground at the front of the drum or cylinder and to lift the soil at the back of the same, and a rotary pulverizing and cleaning device arranged entirely clear of the ground and mounted below the frame and provided with blades operating between the teeth of the drum or cylinder to pulverize the soil carried upward by the same and also to remove the soil from the said teeth to clean the same.

10. A rotary plow including a frame, a traction drum or cylinder arranged to roll on the ground and provided with projecting teeth disposed in transverse rows, a rotary pulverizing device mounted below the frame and arranged entirely clear of the ground provided with projecting members intersecting the path of movement of the rows of teeth and operating between the latter to pulverize the soil carried upward by the said teeth to clean the latter, and means for rotating the pulverizing device at a higher rate of speed than the drum or cylinder.

11. A rotary plow including a frame, a traction drum or cylinder provided with spaced teeth arranged to pierce the ground as the drum or cylinder rolls over the same and adapted to lift the soil at the back of the drum or cylinder, and a rotary pulverizing and cleaning device mounted below the frame and arranged entirely clear of the ground and adjacent to the drum or cylinder and provided with staggered members operating adjacent to the sides of the teeth of the drum or cylinder to clean the said teeth.

12. A rotary plow including a frame, a traction drum or cylinder provided with spaced teeth arranged to pierce the ground as the drum or cylinder rolls over the same and adapted to lift the soil at the back of the drum or cylinder, and a rotary pulverizing and cleaning device mounted below the frame and arranged entirely clear of the ground and comprising a series of sections composed of a hub member having a web and thin narrow resilient blades alternately secured to the opposite faces of the web and extending in opposite directions toward the adjacent teeth of the drum or cylinder.

13. A rotary plow including a frame, a traction drum or cylinder supporting the frame and provided with spaced teeth arranged to pierce the ground as the drum or cylinder rolls over the same and adapted to lift the soil at the back of the drum or cylinder, and a rotary pulverizing and cleaning device comprising a series of sections composed of a hub member having a central web provided at its side faces with spaced ribs arranged in pairs, and thin narrow tapering blades alternately arranged at opposite sides of the web and secured between the ribs and extending between the teeth of the drum or cylinder.

14. A rotary plow including a frame, a traction drum or cylinder supporting the frame and arranged to roll on the ground and provided with combined cultivating and traction teeth, a rotary pulverizing and cleaning device mounted below the frame and arranged clear of the ground and located at the back and adjacent to the drum or cylinder in position to intersect the path of movement of the teeth, and a plurality of scrapers located above the pulverizing and cleaning device and having terminal portions operating between the teeth of the drum or cylinder and arranged to scrape the soil from the face of the said drum or cylinder.

15. A rotary plow including a frame, a traction drum or cylinder provided with combined traction and cultivating teeth, and a plurality of resilient scrapers located at the back of the drum or cylinder and operating between the teeth thereof and having terminal portions arranged to scrape the drum or cylinder for removing the soil from the face of the same.

16. A rotary plow including a traction drum or cylinder arranged to roll on the ground and provided with combined cultivating and traction teeth spaced apart, and a plurality of scrapers arranged at the back of the drum or cylinder and secured at one end and having a hook-shaped engaging portion at the other end for scraping the soil from the face of the cylinder.

17. A rotary plow including a traction drum or cylinder having spaced teeth, a transverse support arranged in rear of the drum or cylinder, and a series of scrapers extending upward from the support toward the drum or cylinder and having hook-shaped terminals arranged to scrape the soil from the face of the drum or cylinder.

18. A rotary plow including a main frame, an axle mounted on the main frame and having extended spindles, a rotary traction drum or cylinder supporting the frame and arranged to roll on the ground and provided with combined cultivating and traction teeth, carrying wheels of greater diameter than the drum or cylinder detachably mounted on the spindles and adapted to be removed to permit the traction drum or cylinder to roll along the ground, a front transverse shaft, a relatively large sprocket wheel connected with the drum or cylinder at the end thereof, a sprocket wheel mounted on the front transverse shaft, a sprocket chain arranged on the sprocket wheel and the sprocket pinion, a rotary pulverizing device mounted on the frame at the back of the cylinder, gearing connecting the pulverizing device with the front transverse shaft, and means carried by the frame of the machine for actuating the front transverse shaft.

19. A rotary plow including a traction drum or cylinder arranged to roll on the ground and provided with transverse rows of curved teeth adapted to separate a strip of soil from the ground and carry the same upward, and a rotary pulverizing and cleaning device mounted entirely clear of the ground and having teeth operating between the teeth of the drum or cylinder at the bottom thereof and arranged to pulverize the strip of soil carried upward by the same.

20. A rotary plow including a main frame, a rotary traction drum or cylinder supporting the main frame and provided with combined traction and cultivating teeth projecting from the face of the drum or cylinder and curved in the direction of the rotation thereof, the curvature of each tooth being such that the entire tooth is forced into the ground at the same point through the forward rolling movement of the drum or cylinder, said teeth being disposed in transverse rows and arranged to lift a strip of soil from the ground, and a rotary pulverizing and cleaning device located entirely clear of the ground and arranged in rear of the cylinder and provided with teeth operating between the teeth of the cylinder and adapted to pulverize the strip of soil carried upward by the same.

21. A rotary plow including a main frame, a rotary traction drum or cylinder supporting the main frame and provided with combined traction and cultivating teeth projecting from the face of the drum or cylinder and curved in the direction of the rotation thereof, the curvature of each tooth being such that the entire tooth is forced into the ground at the same point through the forward rolling movement of the drum or cylinder, said teeth being arranged transversely of the drum or cylinder in diagonal rows and adapted to successively operate on and separate a strip of soil from the ground and carry the same upward, and a rotary pulverizing and cleaning device located entirely clear of the ground and provided with teeth operating between the teeth of the drum or cylinder at the lower portion thereof and arranged to pulverize the strip of ground lifted by the drum or cylinder and also clean the teeth of the latter.

22. A rotary plow including a main frame, a rotary traction drum or cylinder supporting the main frame and provided with combined traction and cultivating teeth projecting from the face of the drum or cylinder and curved in the direction of the rotation thereof, the curvature of each tooth being such that the entire tooth is forced into the ground at the same point through the forward rolling movement of the drum or cylinder, said teeth being disposed in transverse rows and arranged to lift a strip of soil from the ground, and a rotary pulverizing and cleaning device mounted entirely clear of the ground and provided with oppositely extending resilient teeth operating at the back of the drum or cylinder between the teeth thereof and arranged to pulverize the strip of soil carried upward by the drum or cylinder and also to clean the teeth of the latter.

In testimony whereof I affix my signature in presence of two witnesses.

CHARLES H. VAN NOSTRAND.

Witnesses:
JOHN H. SIGGERS,
PENDLETON HOOVER.